United States Patent
Johnson et al.

[11] Patent Number: 6,161,896
[45] Date of Patent: Dec. 19, 2000

[54] AUTOMOTIVE VEHICLE REAR SEAT STORAGE SYSTEM

[75] Inventors: Victor Johnson, Royal Oak; Dorinel Neag, Walled Lake; Daniel W. Husted, Saline; David J. Cauvin, Royal Oak; David Oberson, Livonia, all of Mich.

[73] Assignee: DaimlerChrysler Corporation, Auburn Hills, Mich.

[21] Appl. No.: 09/417,061

[22] Filed: Oct. 13, 1999

[51] Int. Cl.⁷ .................................................. B60N 3/00
[52] U.S. Cl. .................................... 297/188.1; 297/188.08
[58] Field of Search ..................... 297/188.1, 188.09, 297/188.08, 188.11

[56] References Cited

U.S. PATENT DOCUMENTS

| | | |
|---|---|---|
| 1,018,460 | 2/1912 | Walton . |
| 1,368,397 | 2/1921 | Hussander . |
| 1,441,815 | 1/1923 | Lindsey . |
| 1,890,048 | 12/1932 | Flintermann . |
| 2,907,378 | 10/1959 | Barecki . |
| 3,099,482 | 7/1963 | Woodruff . |
| 3,727,970 | 4/1973 | Delmage . |
| 4,813,722 | 3/1989 | Viscome et al. . |
| 4,842,175 | 6/1989 | Towsend . |
| 4,981,277 | 1/1991 | Elwell . |
| 5,096,249 | 3/1992 | Hines . |
| 5,289,962 | 3/1994 | Tull et al. . |
| 5,478,126 | 12/1995 | Laesch . |
| 5,494,249 | 2/1996 | Ozark et al. . |
| 5,524,957 | 6/1996 | Gibriano . |
| 5,573,288 | 11/1996 | Rattensperger ..................... 297/188.1 |
| 5,584,522 | 12/1996 | Kerner et al. ....................... 297/188.1 |
| 5,597,201 | 1/1997 | Hinze . |
| 5,613,723 | 3/1997 | Laesch . |
| 5,622,404 | 4/1997 | Menne . |
| 5,639,052 | 6/1997 | Sauve . |
| 5,692,658 | 12/1997 | Fischer et al. . |

FOREIGN PATENT DOCUMENTS 214095  3/1961  Austria ............................... 297/188.1

*Primary Examiner*—Peter R. Brown
*Attorney, Agent, or Firm*—Roland A. Fuller, III

[57] ABSTRACT

A selectively operable storage system incorporated within the passenger compartment of an automotive vehicle is described. The storage system is preferably deployed underneath the rear seat structure, for example, below the seat bottom structure. The storage system can include any number and combination of selectively operable sliding trays, pivoting trays, collapsible trays, pivoting lids, storage bins, and track systems.

11 Claims, 11 Drawing Sheets

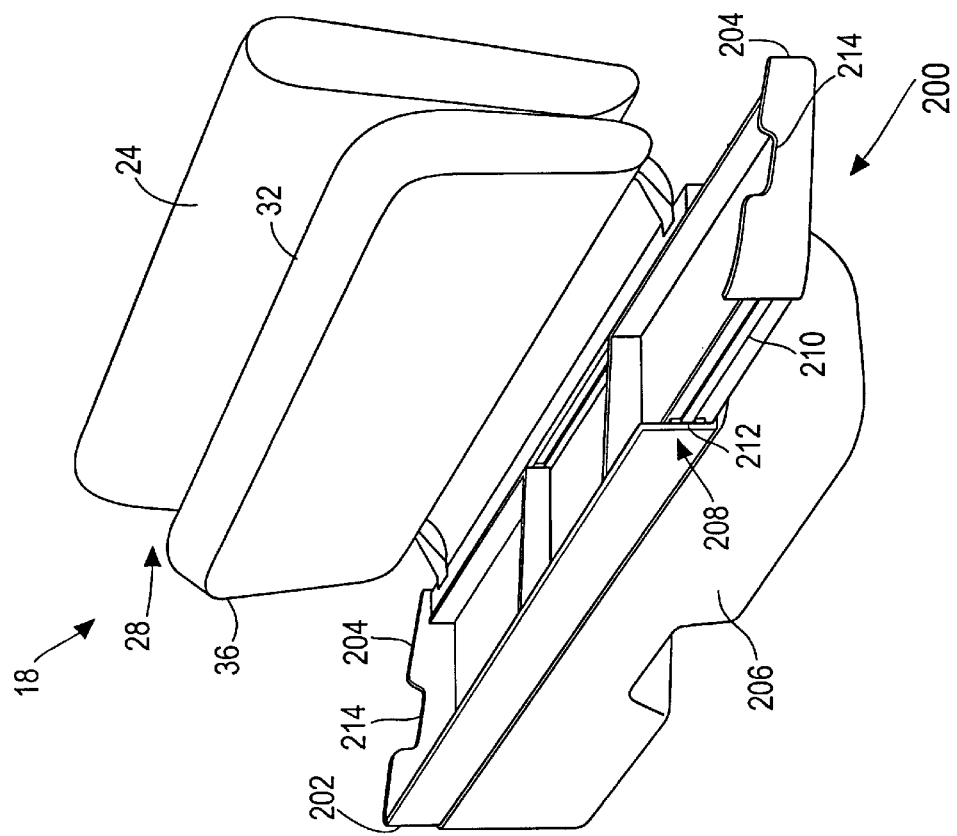
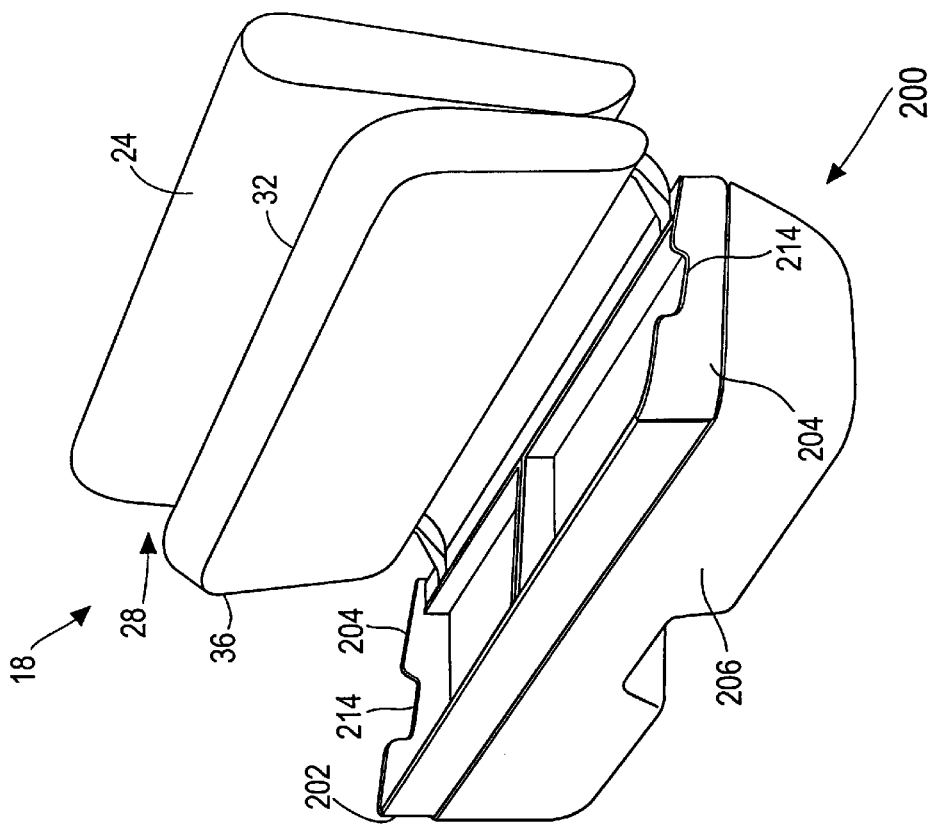

AUTOMOTIVE VEHICLE REAR SEAT STORAGE SYSTEM

BACKGROUND OF THE INVENTION

FIELD OF THE INVENTION

The present invention relates generally to storage compartments, and more particularly to a selectively operable storage system for deployment underneath a rear seat structure of an automotive vehicle.

BACKGROUND AND SUMMARY OF THE INVENTION

With reference to FIG. 1, a typical automotive vehicle 10, such as a sedan, sport utility vehicle (SUV), minivan, extended cab pickup truck, or the like, is generally comprised of an engine compartment 12, a passenger compartment 14 including a front seat structure 16 and at least one rear seat structure 18, and a trunk or bed compartment 20, as the case may be. The respective seat structures 16 and 18 are typically comprised of seat back structures 22, 24, respectively, and seat bottom structures 26, 28, respectively, also referred to as seat cushions. The seat bottom structures, 26, 28, respectively, include top surfaces 30, 32, respectively, and bottom surfaces 34, 36, respectively. The seat bottom structures 26, 28, respectively, typically rest upon at least one support member 38, 40, respectively, e.g., a suitably contoured portion of sheet metal.

The trunk (or bed) compartment 20 has traditionally been utilized to store and transport cargo due to the relatively large amount of free space available (as compared to a fully occupied passenger compartment 14). The passenger compartment 14 is typically utilized to store and transport cargo only when there is insufficient space available in the trunk (or bed) compartment 20, the occupants of the automotive vehicle require ready and convenient access to the cargo, or the trunk (and especially the bed) compartment 20 does not provide the requisite degree of security.

With respect to storage space in the passenger compartment 14, the top surfaces 30, 32, respectively, of the seat bottom structures 26, 28, respectively, are typically used for large or bulky items of cargo. However, this arrangement leaves the cargo fully exposed to would-be thieves. Accordingly, any valuable items of cargo must be stored either in the glove compartment, or, if available, the center console storage compartment. The amount and types of cargo these types of compartments can accommodate is very limited due to their respective size dimensions.

This is a special concern for automotive vehicle owners that need to have certain items within convenient reach in the passenger compartment 14. For example, in certain geographic areas where extreme weather (e.g., blizzards) is likely to unexpectedly force the driver off the road for an extended period of time, the need for a "survival kit" (e.g., a cellular telephone, medical supplies, food and water rations, warm clothing and blankets) necessitates the need for a relatively large, yet inconspicuous and unobtrusive, storage compartment within the passenger compartment 14 that can be readily accessed without having to leave the relative safety of the passenger compartment 14.

Additionally, certain automotive vehicle owners prefer that potentially dangerous (e.g., firearms, knives, archery equipment, sharp-edged hand tools) or expensive (e.g., computers, stereo equipment, power tools, golf clubs) items are secured within the passenger compartment 14 rather than the trunk (or bed) compartment 20, irrespective of the need for ready access.

Therefore, there exists a need for a storage system that can be deployed within the passenger compartment of an automotive vehicle, wherein the storage system can be readily accessed, safely and securely accommodate a relatively large amount of cargo, and is relatively inconspicuous and unobtrusive.

Accordingly, at least one of the objects of the present invention is to provide such a storage system.

In accordance with one embodiment of the present invention, a storage system deployed beneath a bottom surface of a seat bottom structure of a rear seat structure of an automotive vehicle is provided, wherein the rear seat structure further includes a seat back structure, the seat bottom structure being capable of being pivoted upwardly towards the seat back structure. The storage system of this particular embodiment comprises a base, a front wall and a rear wall. The front and rear walls are spaced and opposed, with the base being pivotally fastened to the front and rear walls for permitting the base to collapse upon the front and rear walls, respectively. The base is capable of being positioned substantially parallel to the bottom surface of the seat bottom structure when the base is pivoted towards the rear wall. The base is also capable of being positioned substantially perpendicular to the bottom surface of the seat bottom structure when the base is pivoted away from the rear wall.

In accordance with another embodiment of the present invention, a storage container deployed beneath a bottom surface of a seat bottom structure of a rear seat structure of an automotive vehicle is provided, wherein the rear seat structure further includes a seat back structure, the seat bottom structure being capable of being pivoted upwardly towards the seat back structure. The storage system of this particular embodiment comprises a track member disposed on the bottom surface of the bottom seat structure, a base, a front wall, and a rear wall. The front and rear walls are spaced and opposed, with at least a portion of the rear wall being slidably engaged with the track member. The base is pivotally fastened to the front and rear walls for permitting the base to collapse upon the front and rear walls, respectively. The base is capable of being positioned substantially parallel to the bottom surface of the seat bottom structure when the base is pivoted towards the rear wall. The base is also capable of being positioned substantially perpendicular to the bottom surface of the seat bottom structure when the base is pivoted away from the rear wall.

In accordance with still another embodiment of the present invention, a storage system deployed beneath a bottom surface of a seat bottom structure of a rear seat structure of an automotive vehicle is provided, wherein the rear seat structure further includes a seat back structure, the seat bottom structure being capable of being pivoted upwardly towards the seat back structure. The storage system of this particular embodiment comprises a lid member disposed beneath the bottom surface of the seat bottom structure, the lid member having at least one open end, and a tray member slidably received within the at least one open end of the lid member.

In accordance with yet another embodiment of the present invention, a storage system deployed beneath a bottom surface of a seat bottom structure of a rear seat structure of an automotive vehicle is provided, wherein the rear seat structure further includes a seat back structure, the seat bottom structure being capable of being pivoted upwardly towards the seat back structure. The storage system of this particular embodiment comprises a lid member disposed beneath the bottom surface of the seat bottom structure, the lid member having at least one open end, a tray member slidably received within the at least one open end of the lid member, and a storage bin disposed beneath the bottom surface of the lid member.

In accordance with still yet another embodiment of the present invention, a storage system deployed beneath a bottom surface of a seat bottom structure of a rear seat structure of an automotive vehicle is provided, wherein the rear seat structure further includes a seat back structure, the seat bottom structure being capable of being pivoted upwardly towards the seat back structure. The storage system of this particular embodiment comprises a lid member disposed beneath the bottom surface of the seat bottom structure, the lid member having at least one open end, a tray member slidably received within the at least one open end of the lid member, a storage bin disposed beneath the bottom surface of the lid member, and at least one drawer member slidably received in the storage bin.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from the detailed description.

BRIEF DESCRIPTION OF THE DRAWINGS

The present invention will become more fully understood from the detailed description and the accompanying drawings, wherein:

FIG. 13 is a perspective view of the seat structure depicted in FIG. 12, wherein the seat bottom structure is pivoted upwardly toward the seat back structure in order to expose the first alternative storage system, in accordance with one aspect of the present invention;

FIG. 14 is a perspective view of the seat structure depicted in FIG. 13, wherein a sliding tray of the first alternative storage system has been pulled outwardly on an optional track system away from the interior of the automotive vehicle, in accordance with one aspect of the present invention;

The same reference numerals refer to the same parts throughout the various Figures.

DETAILED DESCRIPTION OF THE PREFERRED EMBODIMENTS

Figure 1:
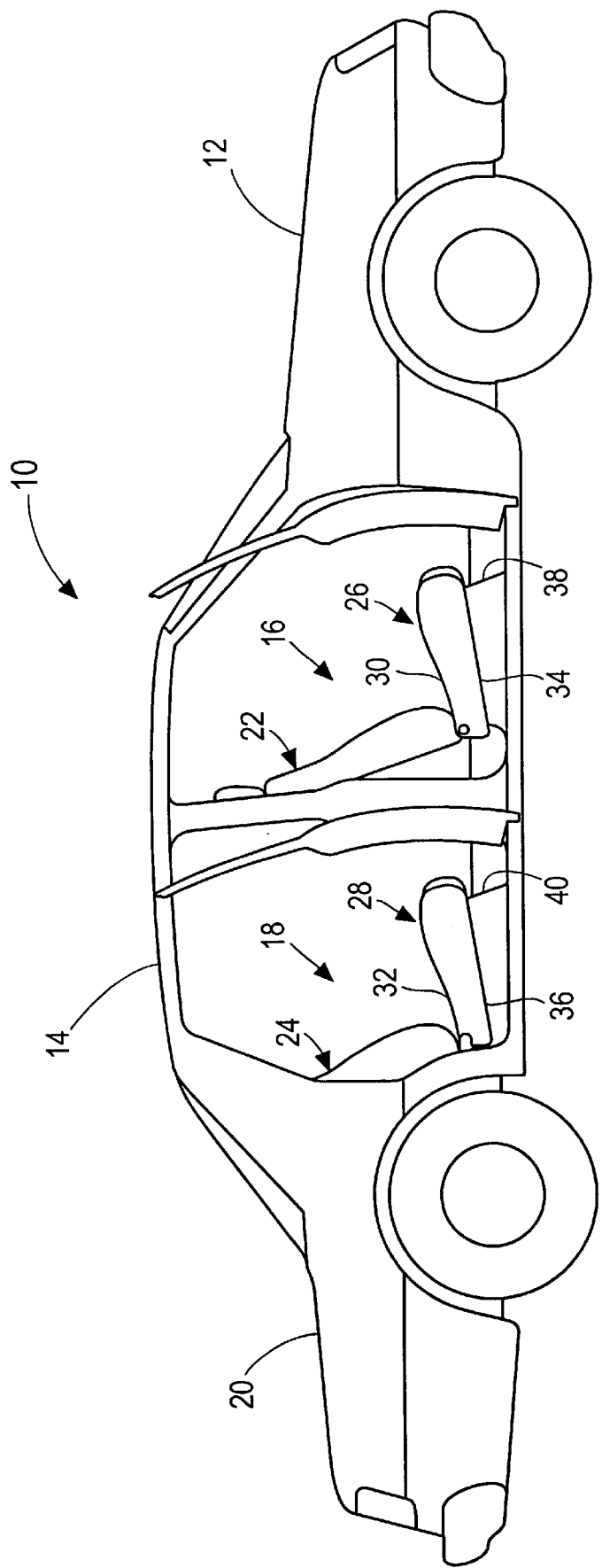
FIG. 1 is a side elevational view of an automotive vehicle with the door panels in the open position in order to expose the passenger compartment, in accordance with the prior art.
Figure 2:
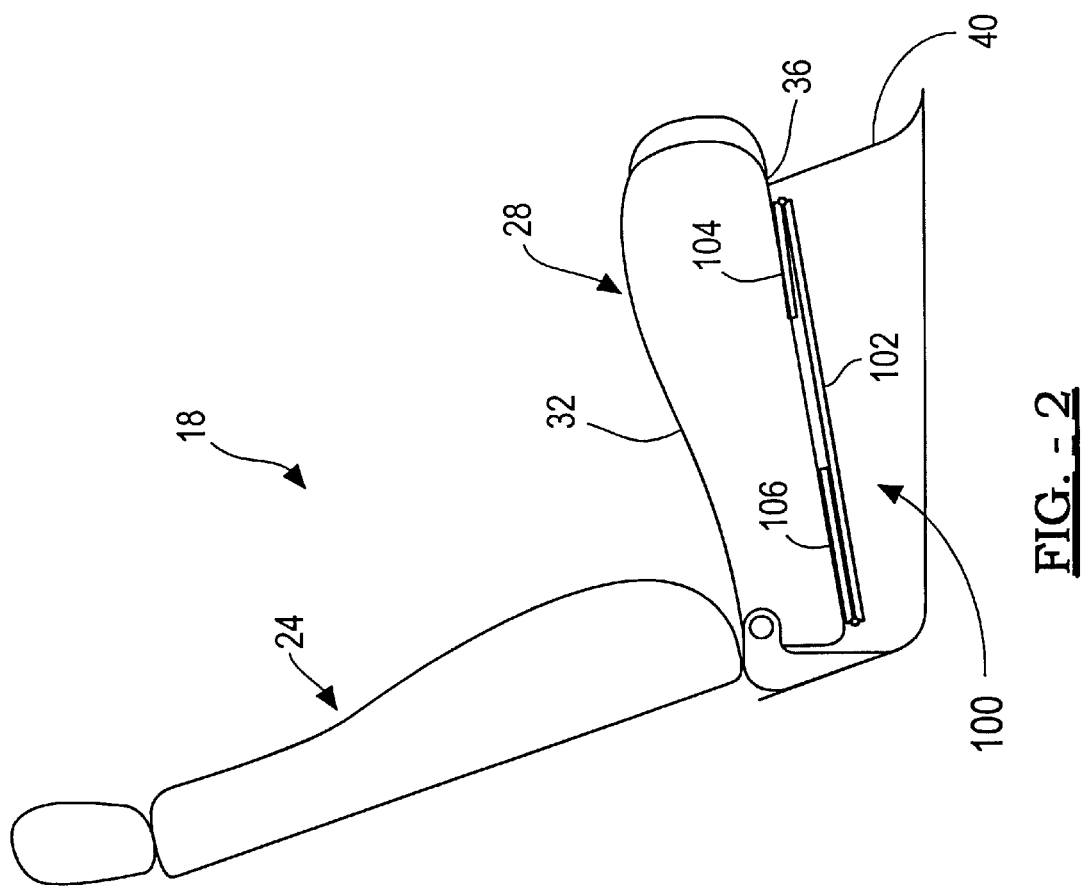
FIG. 2 is a side elevational view of a seat structure having a storage system deployed underneath the seat bottom structure, in accordance with one aspect of the present invention

Although the present invention is directed primarily to a storage compartment deployed within and/or underneath the seat bottom structure of a rear seat structure of an automotive vehicle, it should be noted that the present invention can be practiced with any number of different types (e.g., bucket seats) and locations of seat structures (e.g., front seat structures).

Referring to FIGS. 2–11, there is generally shown a selectively operable storage system 100 for deployment beneath a rear seat structure of an automotive vehicle, in accordance with one embodiment of the present invention.

The storage system 100 is intended to be fully, or at least substantially, collapsible, in that it lies substantially flat when the seat bottom structure 28 is resting upon the support member 40.

The storage system 100 is comprised primarily of a base 102, a front wall 104, and a rear wall 106. The front wall 104 is preferably pivotally fastened to the base 102, and the rear wall 106 is preferably pivotally fastened to the base 102 to enable the storage system 100 to fully collapse upon itself, as previously described. The rear wall 106 is preferably fastened to the bottom surface 36 of the seat bottom structure 28.

Figure 4:
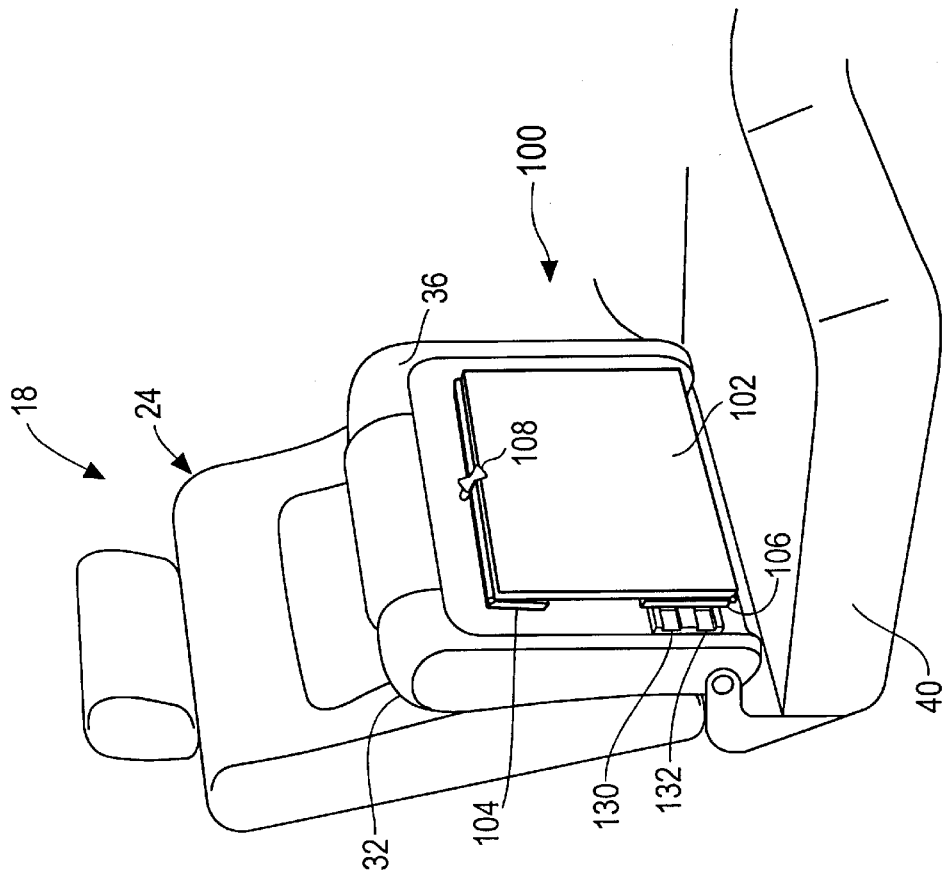
FIG. 4 is a partial perspective view of the seat structure depicted in FIG. 3, in accordance with one aspect of the present invention.
Figure 3:
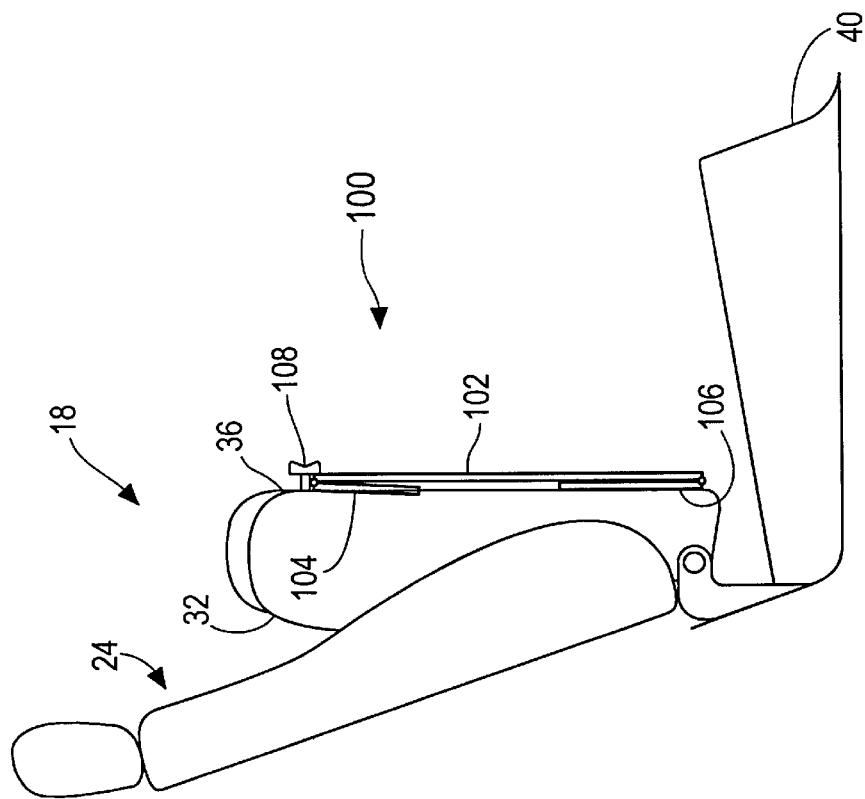
FIG. 3 is a side elevational view of the seat structure depicted in FIG. 2, wherein the seat bottom structure is pivoted upwardly toward the seat back structure in order to expose the storage system, in accordance with one aspect of the present invention.

In order to expose and access the storage system 100, it is first necessary to pivot the seat bottom structure 28 upwardly towards the seat back structure 24, as specifically shown in FIGS. 3 and 4. In this position, the base 102 is substantially parallel to the to the bottom surface 36 of the seat bottom structure 28. An optional latch or locking mechanism (not shown) may be employed to prevent the seat bottom structure 28 from falling down once it is in the fully upwardly pivoted position shown in FIGS. 3 and 4. Additionally, in order to secure the storage system 100 against the bottom surface 36 of the seat bottom structure 28, an optional rotating latch mechanism 108 (e.g., similar to those latch mechanisms found on airplane food trays) may be employed.

Figure 6:
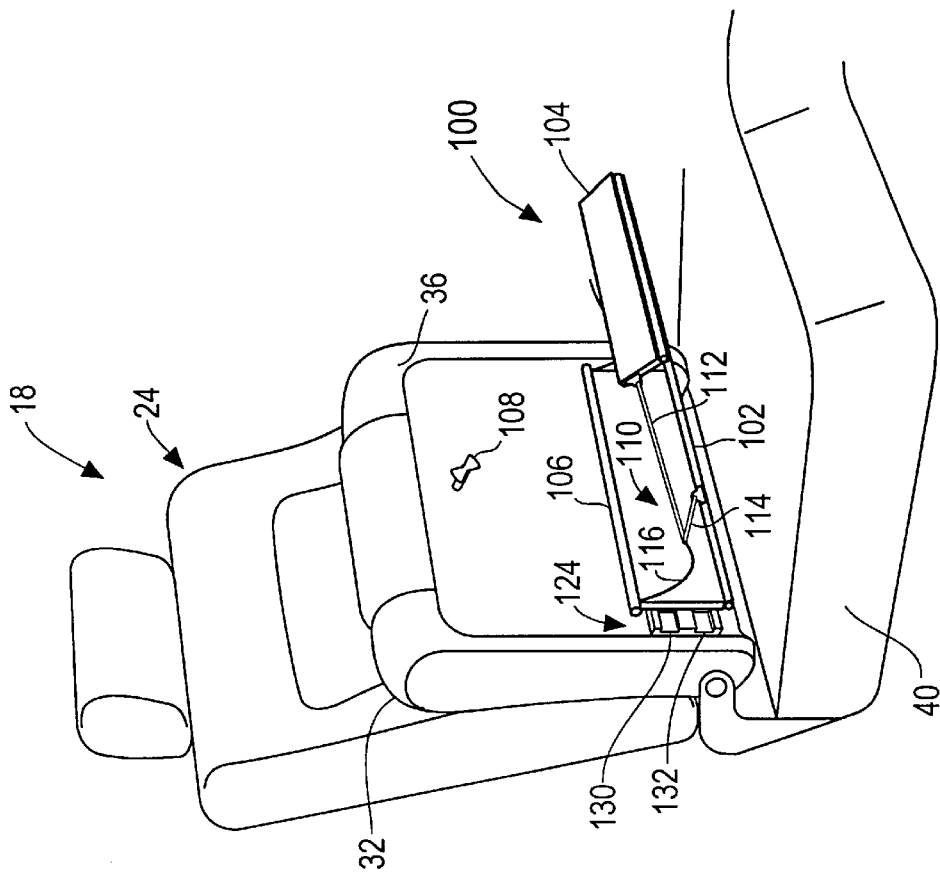
FIG. 6 is a partial perspective view of the seat structure depicted in FIG. 5, in accordance with on aspect of the present invention.
Figure 5:
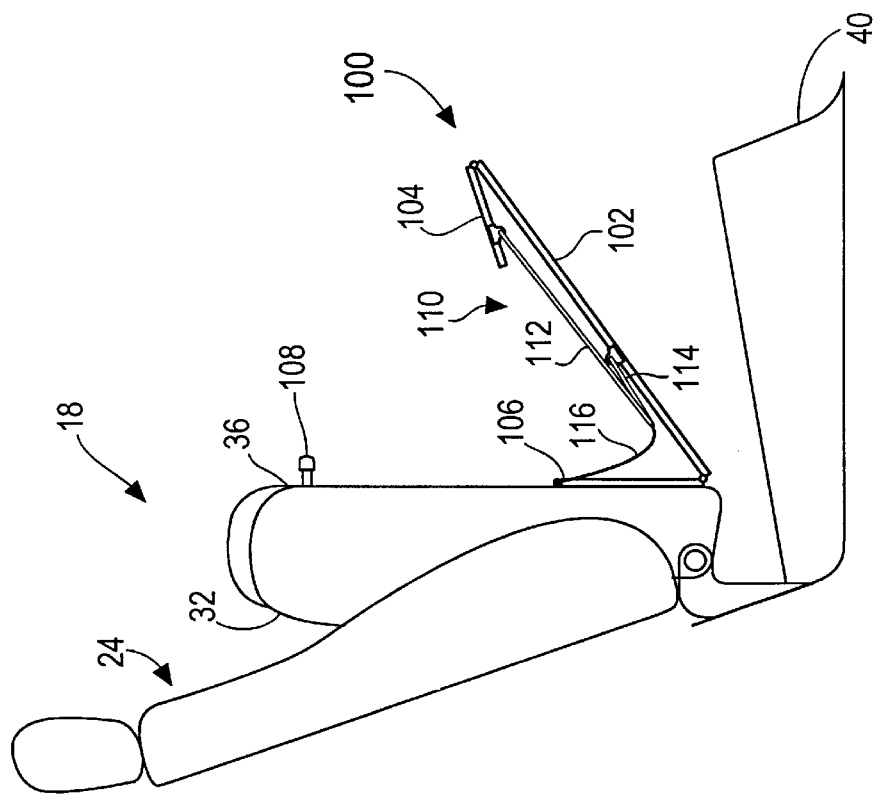
FIG. 5 is a side elevational view of the seat structure depicted in FIG. 3, wherein the storage system is partially pivoted downwardly away from the seat bottom structure, in accordance with one aspect of the present invention.
Figure 8:
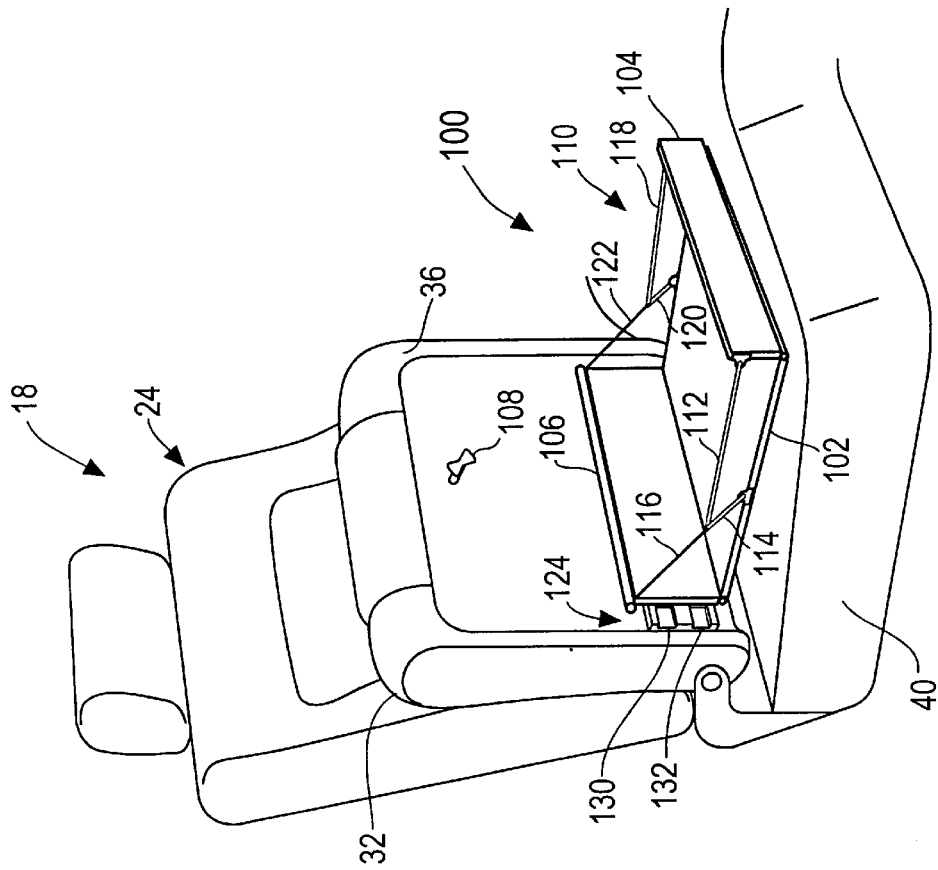
FIG. 8 is a partial perspective view of the seat structure depicted in FIG. 7, in accordance with one aspect of the present invention.
Figure 7:
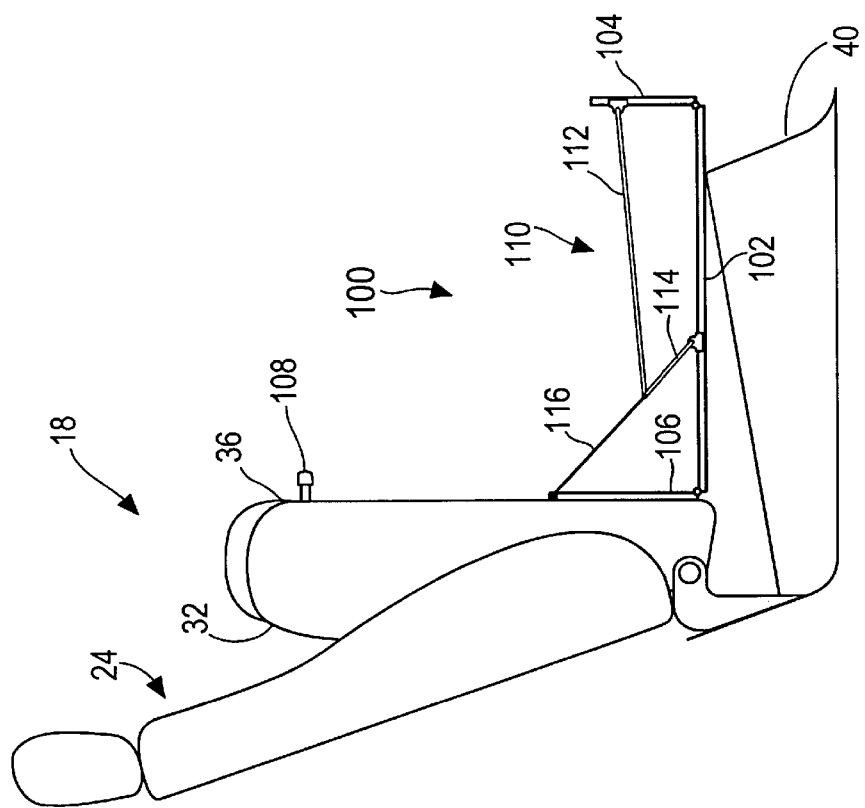
FIG. 7 is a side elevational view of the seat structure depicted in FIG. 5, wherein the storage system is fully pivoted downwardly away from the seat bottom structure, in accordance with one aspect of the present invention.
Figure 11:
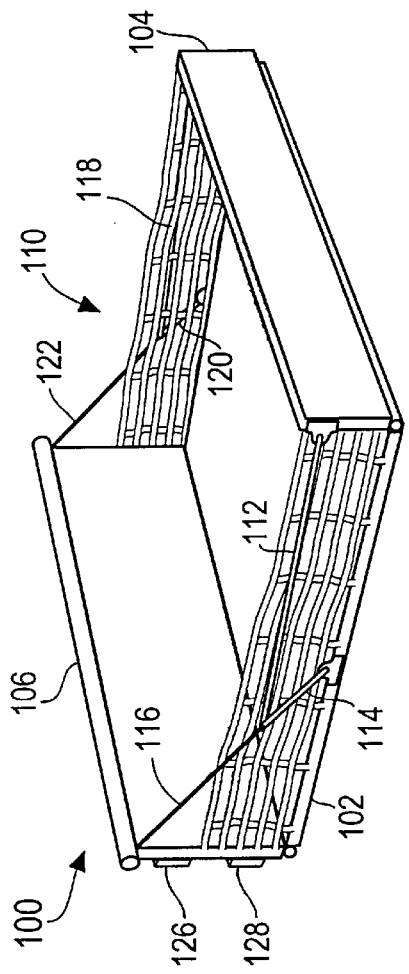
FIG. 11 is a perspective view of a storage system having an optional pair of spaced and opposed side walls, in accordance with one aspect of the present invention.
Figure 10:
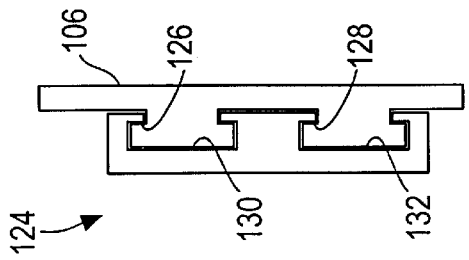
FIG. 10 is a cross-sectional view of the optional track system depicted in FIG. 9, in accordance with one aspect of the present invention.
Figure 9:
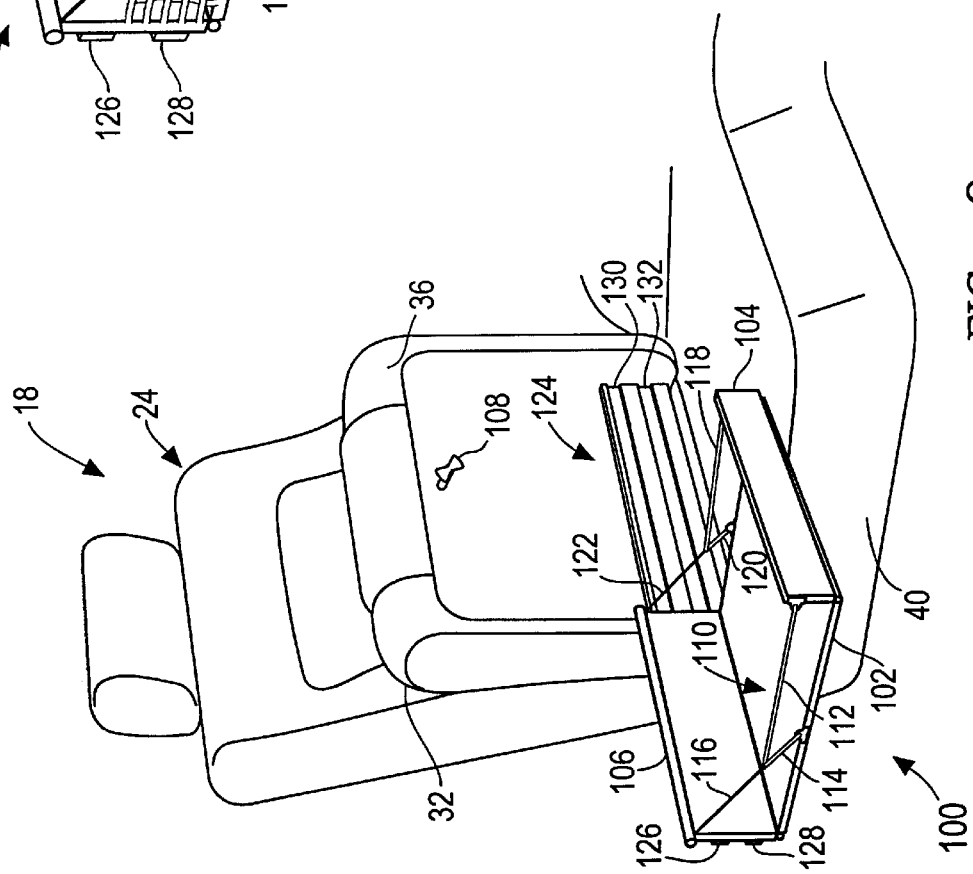
FIG. 9 is a partial perspective view of the seat structure depicted in FIGS. 7 and 8, wherein the storage system has been pulled outwardly on an optional track system away from the interior of the automotive vehicle, in accordance with one aspect of the present invention.
Figure 12:
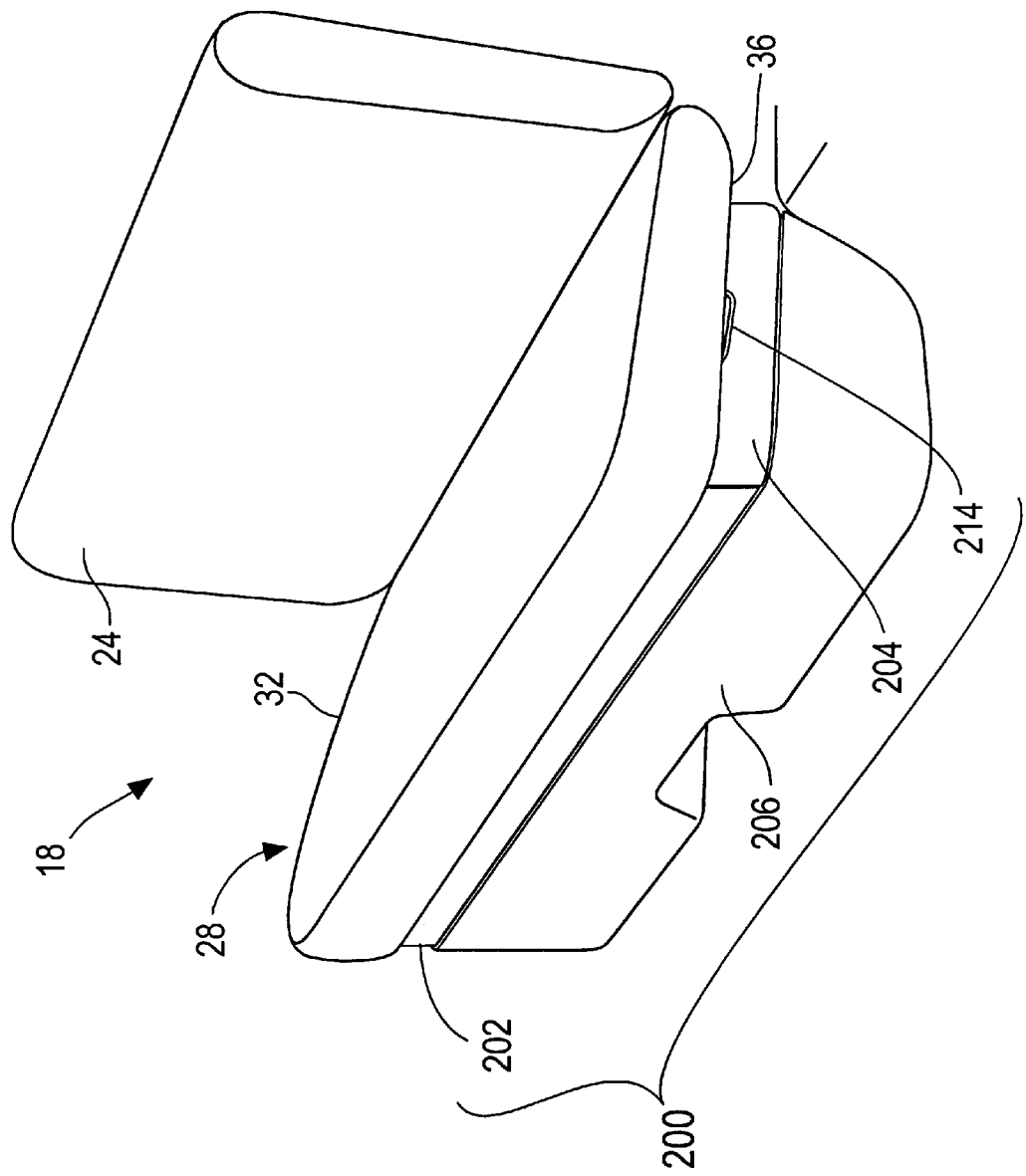
FIG. 12 is a perspective view of a seat structure having a first alternative storage system deployed underneath the seat bottom structure, in accordance with one aspect of the present invention.

In operation, the latch mechanism 108 (if present) is rotated so as to permit the storage system 100 to pivot downwardly away from the bottom surface 36 of the seat bottom structure 28 towards the support member 40, as specifically shown in FIGS. 5–6, until the storage system 100 is in its fully downwardly pivoted position, as specifically shown in FIGS. 7–8. In this position, the base 102 is substantially perpendicular to the bottom surface 36 of the seat bottom structure 28. The base 102 preferably rests upon the support member 40.

In order to ensure that the front wall 104 fully deploys in its upright position, as specifically shown in FIGS. 7 and 8, an optional selectively operable linkage system 110 is provided. By way of a non-limiting example, the linkage system 110 can include a plurality of linkage elements 112, 114, 116, 118, 120, 122, respectively. Preferably linkage elements 112, 118, respectively, are pivotally and slidably fastened to the front wall 104, as well as pivotally fastened to linkage elements 114, 116, 120, 122, respectively. Preferably linkage elements 114, 120, respectively, are pivotally and slidably fastened to the base 102, as well as pivotally fastened to linkage elements 112, 116, 118, 122, respectively. Preferably linkage elements 116, 122, respectively, are fastened to the rear wall 106, as well as to linkage elements 112, 114, 118, 120, respectively. Thus, when the storage system 100 is initially deployed (see FIGS. 5 and 6) linkage elements 116, 122, respectively, exert a tension force on linkage elements 114, 120, respectively, causing linkage elements 114, 120, respectively, to slide along a surface of the base 102 towards the back wall 106, as well as exerting a tension force on linkage elements 112, 118, respectively, causing linkage elements 112, 118, respectively, to slide upwardly along a surface of the front wall 104 until the storage system 100 is in its fully downwardly pivoted position (see FIGS. 7–8). Once the storage system 100 is in this position, cargo may be safely and conveniently loaded or unloaded, as the case may be.

In order to provide greater access to the storage system 100, an optional track system 124 is provided. The track system 124 allows the storage system 100 to be selectively slid outwardly away from the interior of the automotive vehicle in order to allow a person (e.g., physically challenged persons confirmed to wheelchairs) who may have difficulty climbing into, or maneuvering around, the back seat area of the automotive vehicle. By way of a non-limiting example, the rear surface of the back wall 106 may be provided with a pair of elongated track members 126, 128, respectively, that are slidably received in, or otherwise engaged by, a pair of corresponding groove members 130, 132, respectively, disposed within, or alternatively on, the bottom surface 36 of the seat bottom structure 28.

Referring to FIGS. 12–15, there is generally shown a selectively operable storage system 200 for deployment beneath a rear seat structure of an automotive vehicle, in accordance with a first alternative embodiment of the present invention.

The storage system 200 is comprised primarily of a lid 202, at least one tray member 204, and a storage bin 206.

Figure 15:
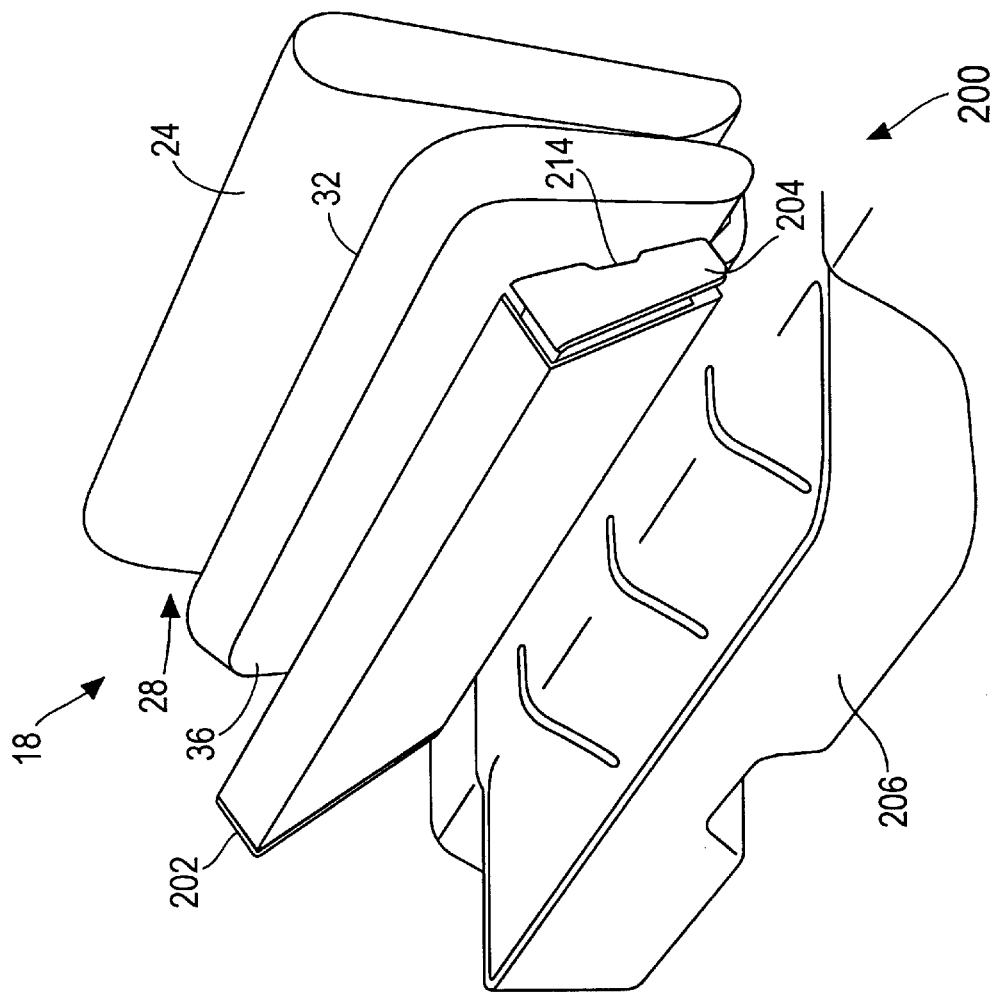
FIG. 15 is a perspective view of the seat structure depicted in FIG. 13, wherein a lid of the first alternative storage system has been pivoted upwardly towards the seat bottom structure in order to expose a storage bin of the first alternative storage system, in accordance with one aspect of the present invention.

In order to expose and access certain components of the storage system 200, it is first necessary to pivot the seat bottom structure 28 upwardly towards the seat back structure 24, as specifically shown in FIGS. 13–15. An optional latch or locking mechanism (not shown) may be employed to prevent the seat bottom structure 28 from falling down once it is in the fully upwardly pivoted position, as specifically shown in FIGS. 13–15. Additionally, an optional locking mechanism (not shown) can be employed (e.g., on the seat bottom structure 28) to prevent unauthorized access to the contents of the lid 202 and the tray member 204.

Once the seat bottom structure 28 is fully pivoted upwardly, the lid 202 is exposed, revealing at least one tray member 204, as specifically shown in FIGS. 13–14. In order to provide greater access to the storage system 200, an optional track system 208 is provided, as specifically shown in FIG. 14. The track system 208 allows the tray member 204 to be selectively slid outwardly away from the interior of the automotive vehicle. By way of a non-limiting example, one or both of the walls of the tray member 204 may be provided with an elongated track member 210 that is slidably received in, or otherwise engaged by, a corresponding groove member 212 disposed within, or alternatively on, one or both of the walls of the lid 202. To facilitate the manipulation of the tray member 204, an optional handle 214 is provided. Additionally, an optional locking mechanism (not shown) can be employed (e.g., on the handle 214) to prevent unauthorized access to the contents of the tray member 204. It should be noted that the handle 214 permits the tray member 204 to be accessed without having to pivot the seat bottom structure 28.

The lid 202 is preferably capable of being pivoted upwardly towards the bottom surface 36 of the seat bottom structure, as specifically shown in FIG. 15. Once the lid 202 is in this position, the interior of the storage bin 206 is exposed. An optional latch or locking mechanism (not shown) may be employed to prevent the lid 202 from falling down once it is in the fully upwardly pivoted position, as specifically shown in FIG. 15. Additionally, an optional locking mechanism (not shown) can be employed (e.g., on the lid 202) to prevent unauthorized access to the contents of the storage bin 206.

The storage bin 206 is located essentially in the same position occupied by the support member previously described. However, the present invention takes advantage of utilizing this previously unused space by deploying the storage bin 206 in its place. Thus, the storage bin 206 can function as a large container for storing big and/or bulky items, or alternatively, a large number of smaller items.

Figure 16:
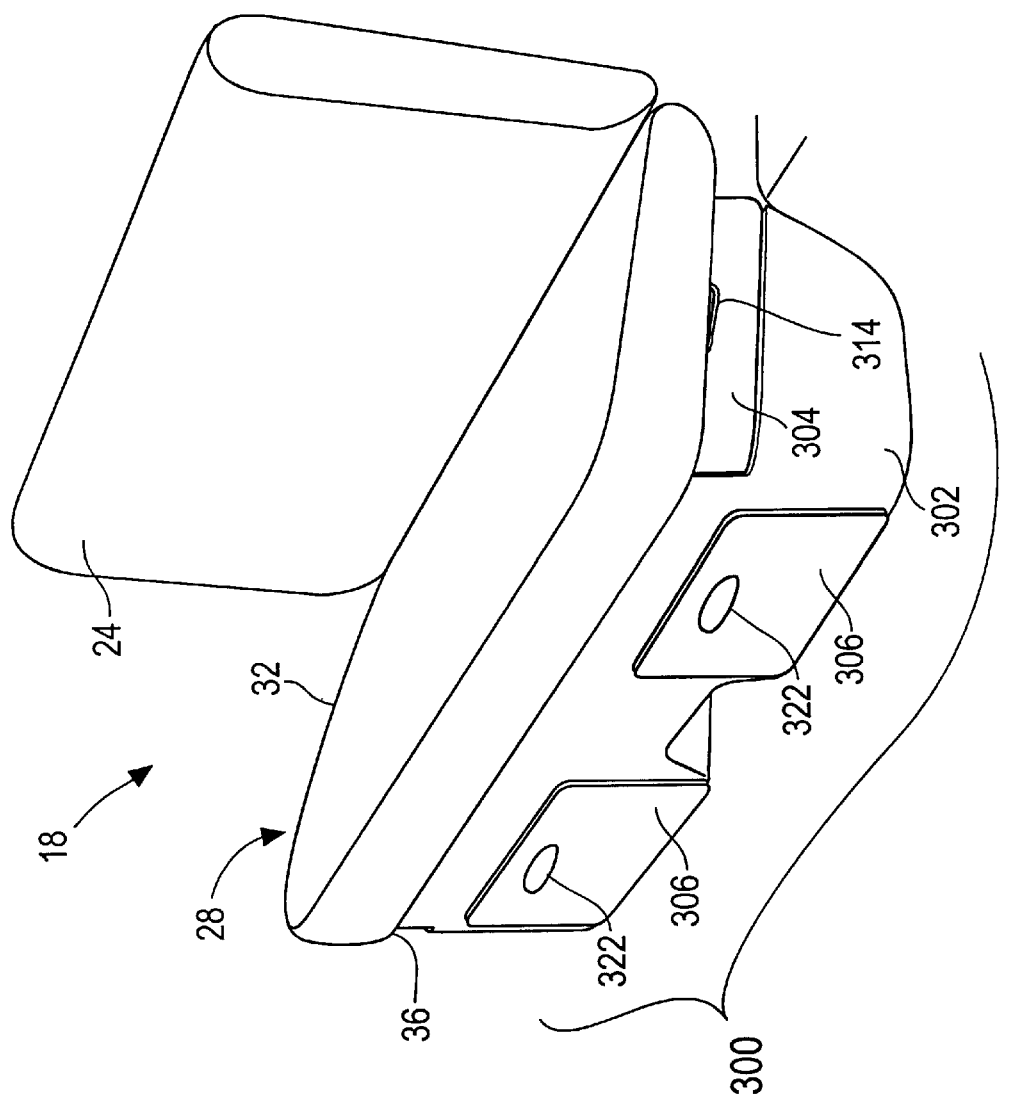
FIG. 16 is a perspective view of a seat structure having a second alternative storage system deployed underneath the seat bottom structure, in accordance with one aspect of the present invention.
Figure 18:
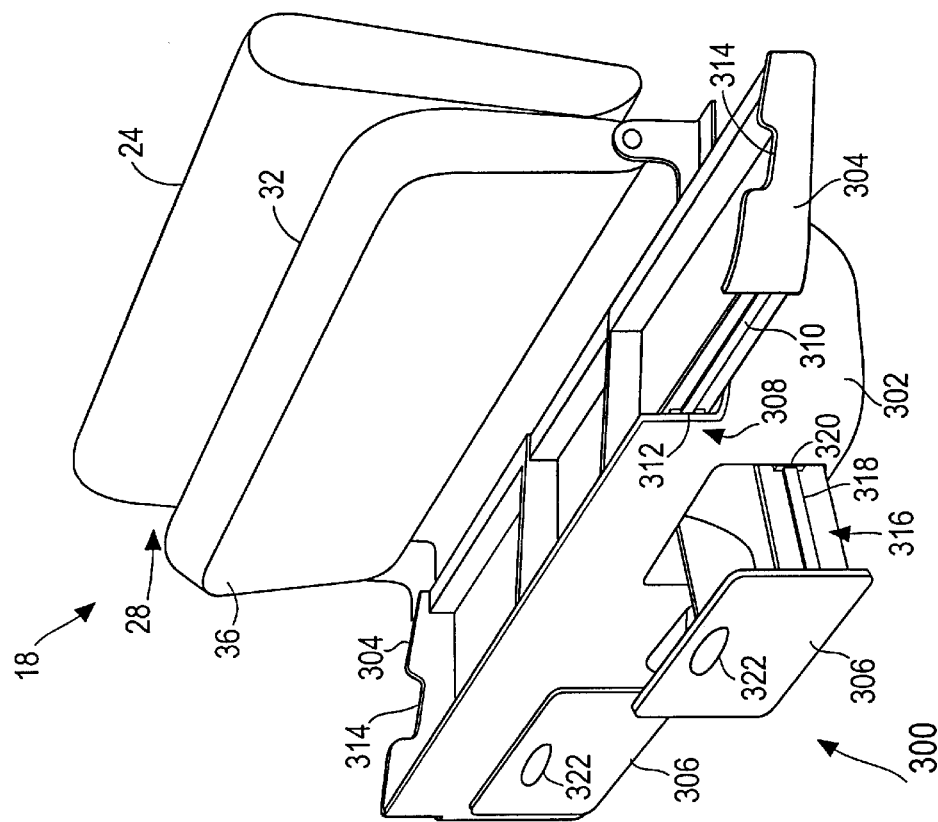
FIG. 18 is a perspective view of the seat structure depicted in FIG. 17, wherein a sliding drawer of the second alternative storage system has been pulled outwardly on an optional track system towards the center of the automotive vehicle, in accordance with one aspect of the present invention.
Figure 17:
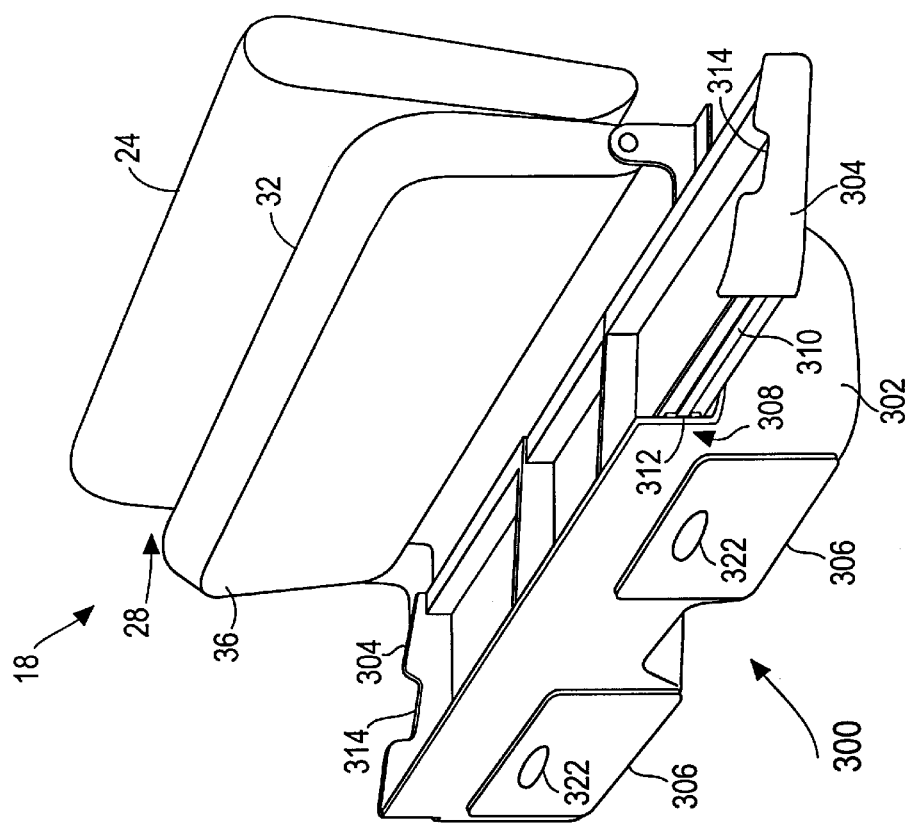
FIG. 17 is a perspective view of the seat structure depicted in FIG. 16, wherein a sliding tray of the second alternative storage system has been pulled outwardly on an optional track system away from the interior of the automotive vehicle, in accordance with one aspect of the present invention.

Referring to FIGS. 16–18, there is generally shown a selectively operable storage system 300 for deployment beneath a rear seat structure of an automotive vehicle, in accordance with a second alternative embodiment of the present invention.

The storage system 300 is comprised primarily of a storage bin 302, at least one tray member 304, and at least one drawer member 306. Again, the storage bin 306 is located essentially in the same position occupied by the support member, as previously described. However, the present invention takes advantage of utilizing this previously unused space by deploying the storage bin 306 in its place. Thus, the storage bin 306 can function as a large container for storing big and/or bulky items, or alternatively, a large number of smaller items.

In order to expose and access certain components of the storage system 300, it is first necessary to pivot the seat bottom structure 28 upwardly towards the seat back structure 24, as specifically shown in FIGS. 17–18. An optional latch or locking mechanism (not shown) may be employed to prevent the seat bottom structure 28 from falling down once it is in the fully upwardly pivoted position, as specifically shown in FIGS. 17–18. Additionally, an optional locking mechanism (not shown) can be employed (e.g., on the seat bottom structure 28) to prevent unauthorized access to the contents of the storage bin 302 and the tray member 304.

Once the seat bottom structure 28 is fully pivoted upwardly, the upper surface of the storage bin 302 is exposed, revealing at least one tray member 304 that is slidably received within the storage bin 302, as specifically shown in FIGS. 17–18. In order to provide easier access to the tray member 304, an optional track system 308 is provided, as specifically shown in FIGS. 17–18. The track system 308 allows the tray member 304 to be selectively slid outwardly away from the interior of the automotive vehicle. By way of a non-limiting example, one or both of the walls of the tray member 304 may be provided with an elongated track member 310 that is slidably received in, or otherwise engaged by, a corresponding groove member 312 disposed within, or alternatively on, one or both of the walls of the storage bin 302. To facilitate the manipulation of the tray member 304, an optional handle 314 is provided. Additionally, an optional locking mechanism (not shown) can be employed (e.g., on the handle 314) to prevent unauthorized access to the contents of the tray member 304. It should be noted that the handle 314 permits the tray member 304 to be accessed without having to pivot the seat bottom structure 28, as previously described.

In order to provide easier access to the storage bin 302, at least one drawer member 306 is provided. The drawer member 306 is preferably slidably received within the storage bin 302, as specifically shown in FIG. 18. In order to provide easier access to the drawer member 306, an optional track system 316 is provided, as specifically shown in FIG. 18. The track system 316 allows the drawer member 306 to be selectively slid outwardly towards the center of the automotive vehicle. By way of a non-limiting example, one or both of the walls of the drawer member 306 may be provided with an elongated track member 318 that is slidably received in, or otherwise engaged by, a corresponding groove member 320 disposed within, or alternatively on, one or more interior walls of the storage bin 302. To facilitate the manipulation of the drawer member 306, an optional handle 322 is provided. Additionally, an optional locking mechanism (not shown) can be employed (e.g., on the handle 322) to prevent unauthorized access to the contents of the drawer member 306. It should be noted that the handle 322 permits the drawer member 306 to be accessed without having to pivot the seat bottom structure 28, as previously described.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A storage system deployed beneath a bottom surface of a seat bottom structure of a rear seat structure of an automotive vehicle, wherein the rear seat structure further includes a seat back structure, the seat bottom structure being capable of being pivoted upwardly towards the seat back structure, comprising:

a base;

a front wall; and a rear wall, the front and rear walls being spaced and opposed, the base being pivotally fastened to the rear wall for permitting the base to contact the rear wall when the base is pivoted towards the rear wall, the base being pivotally fastened to the front wall for permitting the base to contact the front wall when the front wall is pivoted towards the base, the rear wall being fastened to the bottom surface of the seat bottom structure;

wherein the base is capable of being positioned substantially parallel to the bottom surface of the seat bottom structure when the base is pivoted towards the rear wall;

wherein the base is capable of being positioned substantially perpendicular to the bottom surface of the seat bottom structure when the base is pivoted away from the rear wall;

wherein when the seat bottom structure is pivoted upwardly towards the seat back structure, the storage system is capable of being positioned such that the storage system is substantially perpendicular to the seat back structure;

wherein when the seat bottom structure is pivoted downwardly away from the seat back structure, the storage system is capable of being positioned such that the storage system is adjacent to the bottom surface of the seat bottom structure.

2. The invention according to claim 1, further comprising a selectively operable linkage assembly pivotally fastened to the base and the front wall for permitting the front wall to collapse upon the base.

3. The invention according to claim 1, further comprising a track member disposed on the bottom surface of the bottom seat structure, wherein at least a portion of the rear wall is slidably engaged with the track member.

4. The invention according to claim 3, wherein the rear wall is capable of being selectively positioned at any location along the track member.

5. The invention according to claim 1, further comprising a pair of spaced and opposed side walls.

6. The invention according to claim 5, wherein the side walls are capable of collapsing upon the base.

7. A storage container deployed beneath a bottom surface of a seat bottom structure of a rear seat structure of an automotive vehicle, wherein the rear seat structure further includes a seat back structure, the seat bottom structure being capable of being pivoted upwardly towards the seat back structure, comprising:

a track member disposed on the bottom surface of the bottom seat structure; and a base;

a front wall; and a rear wall, the front and rear walls being spaced and opposed, at least a portion of the rear wall being slidably engaged with the track member, the base being pivotally fastened to the rear wall for permitting the base to contact the rear wall when the base is pivoted towards the rear wall, the base being pivotally fastened to the front wall for permitting the base to contact the front wall when the front wall is pivoted towards the base;

wherein the base is capable of being positioned substantially parallel to the bottom surface of the seat bottom structure when the base is pivoted towards the rear wall;

wherein the base is capable of being positioned substantially perpendicular to the bottom surface of the seat bottom structure when the base is pivoted away from the rear walls wherein when the seat bottom structure is pivoted upwardly towards the seat back structure, the storage system is capable of being positioned such that the storage system is substantially perpendicular to the seat back structure;

wherein when the seat bottom structure is pivoted downwardly away from the seat back structure, the storage system is capable of being positioned such that the storage system is adjacent to the bottom surface of the seat bottom structure.

8. The invention according to claim 7, further comprising a selectively operable linkage assembly pivotally fastened to the base and the front wall for permitting the front wall to collapse upon the base.

9. The invention according to claim 7, wherein the rear wall is capable of being selectively positioned at any location along the track member.

10. The invention according to claim 7, further comprising a pair of spaced and opposed side walls.

11. The invention according to claim 10, wherein the side walls are capable of collapsing upon the base.

* * * * *